US012670257B1

(12) United States Patent
Hsu et al.

(10) Patent No.: US 12,670,257 B1
(45) Date of Patent: *Jun. 30, 2026

(54) PROTECTING CUSTOMERS AGAINST SUPPLY CHAIN ATTACKS BY DETECTING A BEHAVIOR CHANGE BETWEEN VERSIONS OF AN APPLICATION PROGRAM

(71) Applicant: VicOne Corporation, Tokyo (JP)

(72) Inventors: Shih-Han Hsu, Taipei (TW); Wei-Jen Chang, Taipei (TW); Yao-Tang Chang, Taipei (TW); Yi-Li Cheng, Taipei (TW)

(73) Assignee: VicOne Corporation, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 19/013,815

(22) Filed: Jan. 8, 2025

Related U.S. Application Data

(63) Continuation of application No. 17/894,690, filed on Aug. 24, 2022, now Pat. No. 12,223,045.

(51) Int. Cl.
G06F 21/56 (2013.01)

(52) U.S. Cl.
CPC ...... G06F 21/566 (2013.01); G06F 2221/033 (2013.01)

(58) Field of Classification Search
CPC .......................... G06F 21/566; G06F 2221/033
See application file for complete search history.

(56) References Cited

U.S. PATENT DOCUMENTS

| | | | |
|---|---|---|---|
| 11,455,400 B2 | 9/2022 | Fox et al. | |
| 12,019,749 B2 | 6/2024 | Yerra et al. | |
| 2004/0143749 A1* | 7/2004 | Tajalli .................... | G06F 21/316 726/23 |
| 2019/0138717 A1* | 5/2019 | Ben-Shalom ......... | G06F 21/552 |
| 2019/0319977 A1* | 10/2019 | Gottschlich ........... | G06F 18/214 |
| 2021/0056209 A1* | 2/2021 | Fox ........................ | G06F 21/563 |
| 2023/0252152 A1* | 8/2023 | Yerra ...................... | G06F 21/57 726/26 |
| 2023/0259620 A1* | 8/2023 | Schaefer ................. | H04L 63/14 726/23 |
| 2024/0273196 A1* | 8/2024 | Steinberg ................. | G06F 8/75 |

OTHER PUBLICATIONS

David et al., "DeepSign: Deep Learning for Automatic Malware Signature Generation and Classification", International Joint Conference on Neural Networks (IJCNN), Oct. 18, 2016, DOI: 10.1109/ IJCNN.2015.7280815.

(Continued)

*Primary Examiner* — Techane Gergiso
(74) *Attorney, Agent, or Firm* — Beyer Law Group LLP

(57) ABSTRACT

Versions of an application program are evaluated to protect a customer from a supply chain attack. The versions of the application program are executed in to identify behaviors exhibited by the versions of the application program, each of the behaviors including activities that perform computer operations. A behavior change is detected by identifying a behavior that is not common to the versions of the application program.

10 Claims, 10 Drawing Sheets

(56)           References Cited

OTHER PUBLICATIONS

Pan et al., "Malware Classification Based on the Behavior Analysis and Back Propagation Neural Network", ITM Web of Conferences, Nov. 21, 2016, pp. 1-5, DOI: 10.1051/itmconf/20160702001.

Sutskever et al., "Sequence to Sequence Learning with Neural Networks", Advances in Nueral Information Processing Systems 27 (NeurIPS Proceedings 2014), Dec. 14, 2014, ISBN: 9781510800410.

"DBSCAN", Wikipedia, last edited Apr. 24, 2022, https://en.wikipedia.org/w/index.php?title=DBSCAN&oldid=1084395414.

"Dimensionality reduction", Wikipedia, last edited Jul. 1, 2022, https://en.wikipedia.org/w/index.php?title=Dimensionality_reduction&oldid=1096032691.

"Jaccard index", Wikipedia, last edited Jun. 19, 2022, https://en.wikipedia.org/w/index.php?title=Jaccard_index&oldid=1093922825.

Trinius et al, "A Malware Instruction Set for Behavior-Based Analysis", pp. 1-11, University of Mannheim, Germany.

Process Status API, Microsoft, Jul. 27, 2022, https://learn.microsoft.com/en-us/windows/win32/api/_psapi/.

"Word embedding", Wikipedia, Nov. 2022, https://en.wikipedia.org/wiki/Word_embedding.

* cited by examiner

312 →

`<LdrGetDllHandle FileName="C:\windows\system32\ADVAPI32.dll" Flags="1242472" BaseAddress=0x77dd0000/>`

401 →

313 →

| Category | API | File Extension | Path | Flags | FileName | Parameter | Address |
|---|---|---|---|---|---|---|---|
| 06 | 03 | 0191feb5 | 00d48a31 | 00125568 | 0270a6b7 | 00000000 | 77dd0000 |
| LdrGetDllHandle | | dll | C:\windows\system32 | 1242472 | ADVAPI32 | - | BaseAddress |

314-1   314-2   314-3   314-4

402 →

319 →

[0, 0, 0.1, 0.5, ...,0]

1

PROTECTING CUSTOMERS AGAINST SUPPLY CHAIN ATTACKS BY DETECTING A BEHAVIOR CHANGE BETWEEN VERSIONS OF AN APPLICATION PROGRAM

CROSS-REFERENCE TO RELATED APPLICATION

The present application is a continuation of U.S. application Ser. No. 17/894,690, filed on Aug. 24, 2022, which is incorporated herein by reference in its entirety.

TECHNICAL FIELD

The present disclosure is directed to cybersecurity.

BACKGROUND

A supply chain attack is a type of cyberthreat that attacks an organization by way of the organization's supply chain. For example, the organization may employ an application program that is provided by a supplier over the Internet. Unbeknownst to the supplier, an attacker may infect the application program by including malicious code to an update or patch of the application program, which is subsequently provided by the supplier to the customer. A problem with supply chain attacks is that customers usually trust their suppliers, which may not have adequate cybersecurity measures in place or cannot detect cyberthreats that are tailored to a specific customer.

BRIEF SUMMARY

In one embodiment, a method of evaluating an application program to protect a customer against a supply chain attack includes receiving a first version of the application program. The first version of the application program is executed to identify a first set of behaviors exhibited by the first version of the application program during execution, each behavior of the first set of behaviors comprising activities that perform computer operations. A second version of the application program is received and executed to identify a second set of behaviors exhibited by the second version of the application program during execution, each behavior of the second set of behaviors comprising activities that perform computer operations. A first behavior in the first set of behaviors that is not present in the second set of behaviors is identified. A behavior change between the first and second versions of the application program is detected in response to identifying the first behavior. A behavior change notification is issued in response to detecting the behavior change.

In another embodiment, a system comprises a memory and a processor, the memory storing instructions that when executed by the processor cause the system to: execute a first version of an application program to identify a first set of behaviors exhibited by the first version of the application program during execution, each behavior of the first set of behaviors comprising activities that perform computer operations; execute a second version of the application program to identify a second set of behaviors exhibited by the second version of the application program during execution, each behavior of the second set of behaviors comprising activities that perform computer operations; identify a first behavior in the first set of behaviors that is not present in the second set of behaviors; detect a behavior change between the first and second versions of the application program in response to identifying the first behavior; and issue a behavior change notification in response to detecting the behavior change.

In yet another embodiment, a method of evaluating an application program to protect a customer against a supply chain attack includes executing a first version of the application program to detect a plurality of activities of the first version of the application program that perform computer operations. The plurality of activities are represented as a plurality of activity vectors. The plurality of activity vectors is clustered into a plurality of clusters, a center of each cluster being designated as a behavior vector that represents a behavior of the first version of the application program. A second version of the application program is received. A behavior change between the first and second versions of the application program is detected in response to identifying a first behavior vector of the second version of the application program that is not common to both the first and second versions of the application program.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
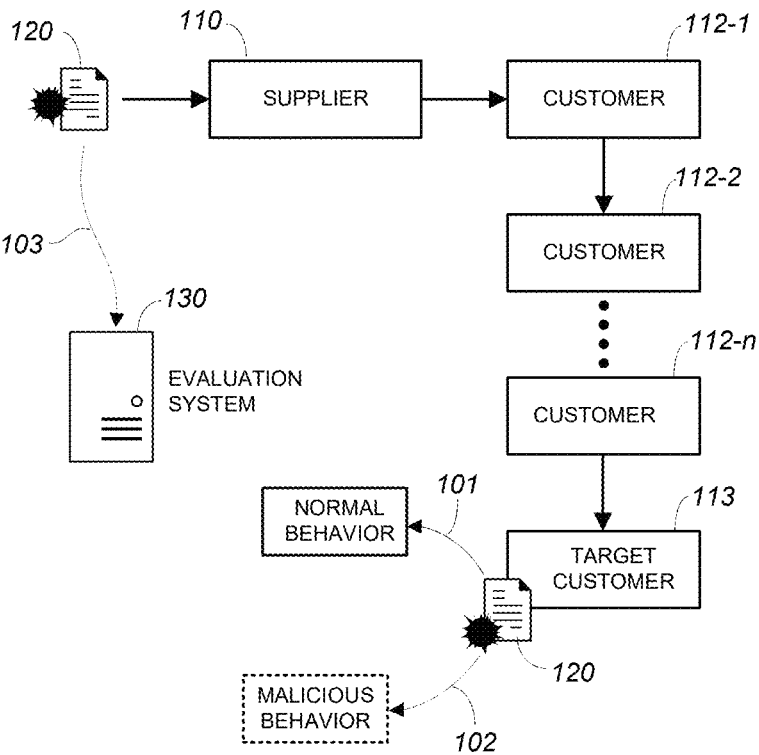
FIG. 1 is a logical diagram that illustrates deployment of an evaluation system for protecting customers against supply chain attacks in accordance with an embodiment of the present invention.

FIG. 1 is a logical diagram that illustrates deployment of an evaluation system for protecting customers against supply chain attacks in accordance with an embodiment of the present invention. In the example FIG. 1, a supplier 110 is part of a supply chain of a plurality of customers 112 (i.e., 112-1, 112-2, . . . , 112-_n_), 113. The supplier 110 provides an application program 120, including updates or patches to the application program 120, to the customers 112, 113 over the Internet. Unbeknownst to the supplier 110, an attacker may tamper with or otherwise change the application program 120, e.g., by way of updates or patches, to include malicious code. The malicious code may be, but not necessarily, tailored to attack the target customer 113. That is, the malicious code may only activate upon execution in a computing environment of the target customer 113, making the malicious code particularly difficult to detect.

The application program 120 may have a previous version and a new version. The new version of the application program 120 may be an update to the previous version or the previous version that is patched with update code. Either way, when executed on a computer system of the target customer 113, the application program 120 may exhibit normal (see arrow 101) and malicious (see arrow 102) behaviors. The malicious behavior may not be explicit, making the malicious behavior appear "normal" and thus difficult to detect.

In one embodiment, an evaluation system 130 comprises a computer system having hardware and software components for protecting customers against supply chain attacks. The functionality of the evaluation system 130 may be distributed over one or more computers. The evaluation system 130 is configured to receive and evaluate versions of an application program (see arrow 103) to determine whether or not the behavior of the application program has changed, which may indicate a supply chain attack. The evaluation system 130 may be deployed as an in-the-cloud service for evaluating application programs or the execution platform of the customer.

Figure 2:
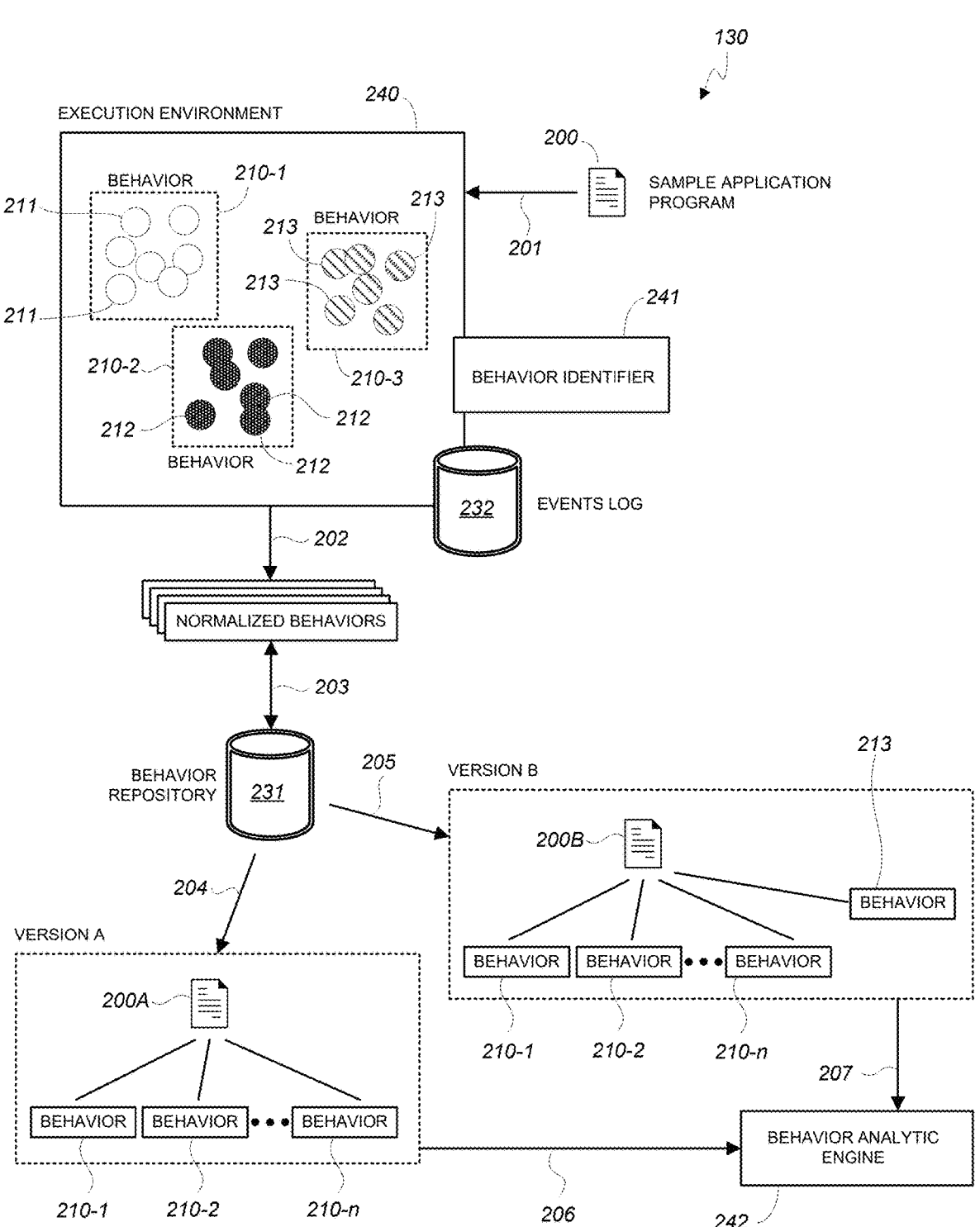
FIG. 2 is a logical diagram of components of the evaluation system of FIG. 1 in accordance with an embodiment of the present invention.

FIG. 2 is a logical diagram of components of the evaluation system 130 in accordance with an embodiment of the present invention. The evaluation system 130 may include a behavior identifier 241 and a behavior analytic engine 242, both of which may be implemented as instructions stored in the main memory of the evaluation system 130 for execution by a processor of the evaluation system 130. The evaluation system 130 includes one or more data storage devices for implementing an events log, a behavior repository, an activity repository, and other database or listing.

The evaluation system 130 hosts an execution environment 240. The execution environment 240 may be a virtual or physical computing environment where application programs provided by suppliers are executed. The execution environment 240 may be a sandbox, for example. Sandboxes are well known in the field of cybersecurity for executing (also referred to as "detonating") application programs in a monitored and controlled environment. A sample application program 200 to be evaluated is received and executed in the execution environment 240 for behavior identification (see arrow 201). Data generated by the execution of the application program 200 in the execution environment 240 are collected and stored in an events log 232.

An application program performs multiple activities to exhibit a behavior, such as to create a new program process, write data to a file, request to connect to another device, etc. An activity is a specific computer operation, such as creating a specific program process, creating a file with a specific pattern, connecting to a remote device at a certain frequency, etc. Activities that do similar computer operations may be collected and grouped together to identify a specific behavior. That is, a behavior of an application program may be defined in terms of activities that are performed by the application program to exhibit the behavior. An application program may exhibit a plurality of behaviors, with each behavior comprising activities of the application program that perform computer operations.

The behavior identifier 241 is configured to extract from the events log 232 activity data of the application program 200 (i.e., data regarding activities performed by the application program at runtime), identify activities from the activity data, aggregate similar activities into groups of activities, and identify a behavior that is representative of a particular group of activities. In the example of FIG. 2, a behavior 210 (i.e., 210-1, 210-2, 210-3, etc.) of the application program 200 is a superset of a group of similar activities performed by application program 200. An activity is represented in FIG. 2 as a circle within a dashed boundary that represents a behavior 210. In the example of FIG. 2, the application program exhibited behaviors 210-1, 210-2, and 210-3 during execution in the execution environment 240. The behavior 210-1 comprises the activities 211, the behavior 210-2 comprises the activities 212, and the behavior 210-3 comprises the activities 213.

As will be further explained in the later discussion of subsequent figures, the behavior identifier 241 may identify behaviors by vectorization in conjunction with a clustering algorithm to identify a cluster of activities. A center or other data point that is representative of a cluster of activities may be designated as a specific behavior.

The identified behaviors 210 of the application program 200 are normalized (see arrow 202) and thereafter stored in a behavior repository 231 (see arrow 203). Behaviors in the behavior repository 231 may be updated or synchronized with newly identified behaviors. Behaviors of specific versions of an application program are stored in the behavior repository 231. In one embodiment, the behavior repository 231 stores behaviors in vector form.

In the example of FIG. 2, an application program 200A and an application program 200B are two different versions ("version A" and "version B") of the application program 200. The application program 200A is a previous version of the application program 200 and the application program 200B is the new version of the application program 200. During execution of the versions in the execution environment 240, the behavior identifier 241 detected that the application program 200A exhibited behaviors 210-1, 210-2, . . . , 210-_n_, whereas the application program 200B exhibited behaviors 210-1, 210-2, . . . , 210-_n_ and 213. That is, the application program 200B has a new behavior 213 that is not common to both the application programs 200A and 200B. The behaviors of the application programs 200A (see arrow 204) and 200B (see arrow 205) may be retrieved from the behavior repository 231.

The behavior analytic engine 242 receives and evaluates the behaviors of the application program 200A (see arrow 206) and the application program 200B (see arrow 207) to identify one or more differing behaviors, i.e., behaviors that are not common to both the application program 200A and application program 200B. The behavior analytic engine 242 determines whether the differing behaviors are similar. The similarity may be, for example, in terms of the distance between vectors that represent the differing behaviors. Differing behaviors that are similar may be merged together, and the behavior repository 231 may be updated with the merged behavior. Otherwise, if a differing behavior cannot be merged with another behavior, the behavior analytic engine 242 deems the differing behavior to indicate a behavior change. In the example of FIG. 2, the behavior 213 cannot be merged with another behavior and thus remains separate. Accordingly, the behavior analytic engine 242 detects a behavior change, which in this case is a new behavior (i.e., the behavior 213) exhibited by the application program 200B but not by the application program 200A.

As a response action to the detected behavior change, the behavior analytic engine 242 issues a behavior change notification as a warning to a network administrator or other personnel that the application program 200B needs to be further investigated. For example, the network administrator may contact the supplier to inquire about the behavior change. As another example, the application programs 200A and 200B may be subjected to more rigorous cybersecurity evaluation. The behavior analytic engine 242 may display the behavior change notification as a pop-up message on a display screen of the evaluation system 130 or of another computer system that subscribes to the evaluation service of the evaluation system 130.

Figure 3:
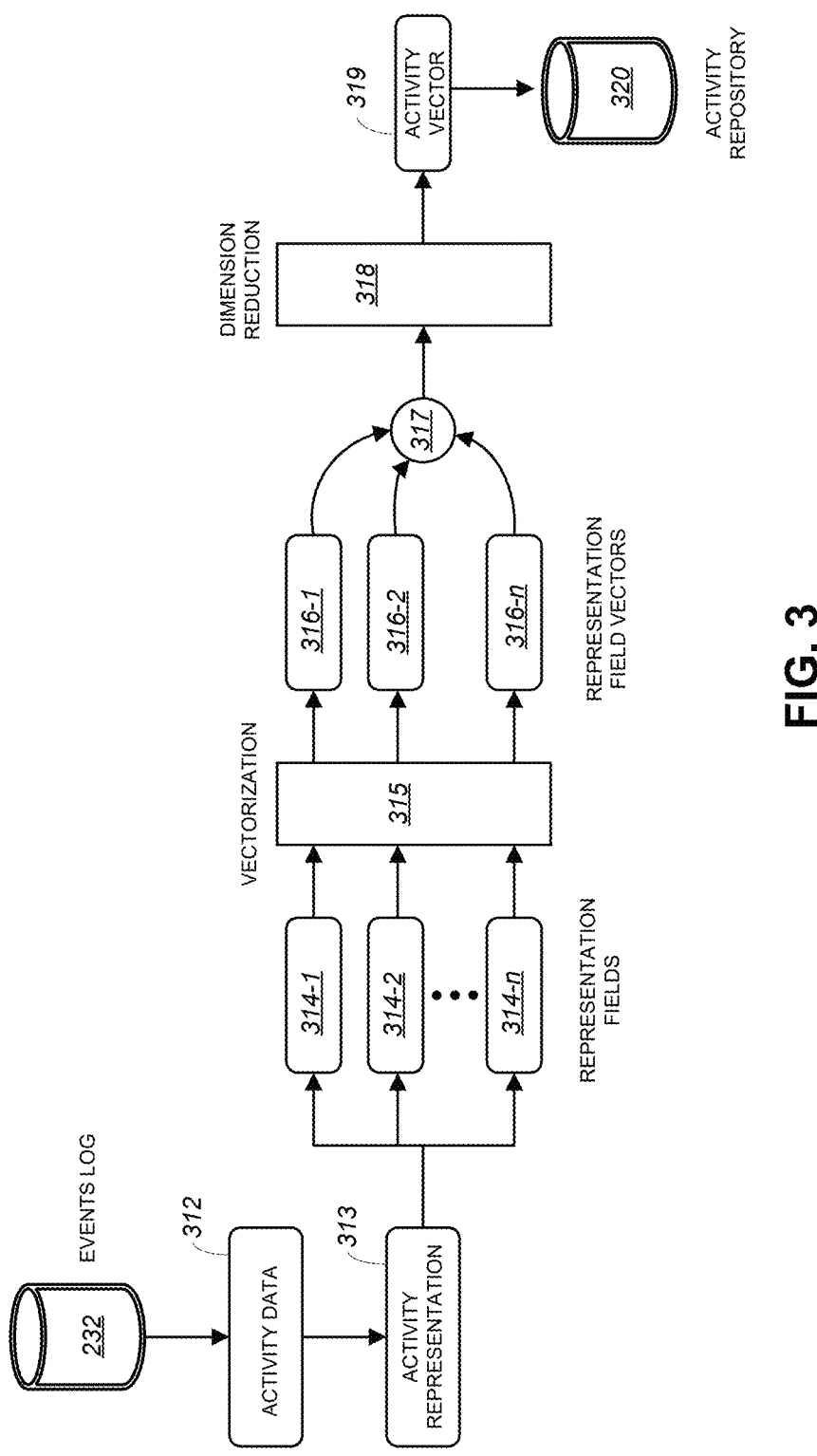
FIG. 3 is a logical diagram that illustrates generation of an activity vector of an activity in accordance with an embodiment of the present invention.

FIG. 3 is a logical diagram that illustrates generation of an activity vector of an activity in accordance with an embodiment of the present invention. In the example of FIG. 3, activity data 312 comprises entries recorded in the events log 232 during execution of an application program running in the execution environment 240. The activity data 312 describes an activity performed by the application program in the execution environment 240. The activity data 312, which is in the recording format of the events log 232, is converted to an activity representation 313, which is in a format that is easier to process for feature extraction.

Figure 4:
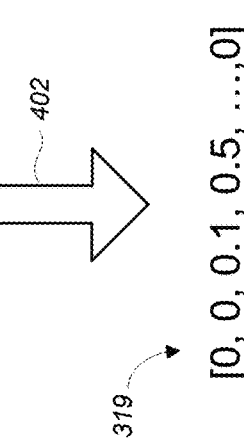
FIG. 4 illustrates an example conversion of activity data to an activity vector in accordance with an embodiment with the present invention.

In one embodiment, the activity representation 313 is in the Malware Instruction Set (MIST) format. FIG. 4 shows an example activity data 312, which is in raw data log format of the events log 232. The activity data 312 indicates a computer operation to get the handle of a loaded a dynamic link library (DLL) and includes data relating to the computer operation, such as the file path and name of the DLL, flags of the DLL, parameters of the DLL (if any), the memory address of the DLL, etc. The activity data 312 is converted to the activity representation 313 in MIST format (see arrow 401). The activity representation 313 includes a plurality of representation fields 314 (i.e., 314-1, 314-2, 314-3, 314-4, . . . ) that each represents data that is pertinent to the activity. A representation field 314 may indicate a filename, file path, type of the file, size of the file, hash of the file, and various other data involving the activity. Representation fields 314 may be used to generate features of a vector that represents the activity. Vectorization, sequence embedding, and dimension reduction processes may be performed on the activity representation 313 to generate an activity vector 319 (see arrow 402) that represents the activity reported by the activity data 312. As can be appreciated, embodiments of the present invention may employ representation field formats other than MIST. Also, FIG. 4 shows specific values for illustration purposes only.

Continuing in FIG. 3, the activity representation 313 consists of a plurality of representation fields 314. A vectorization process 315 converts each representation field 314 to a representation field vector 316 (i.e., 316-1, 316-2, . . . , 316-n). In the example of FIG. 3, the representation field 314-1 is converted to a representation field vector 316-1, the representation field 314-2 is converted to a representation field vector 316-2, etc. The vectorization process 315 may include word-character embedding by Deep Neural Network or other suitable vectorization process. A sequence embedding process 317 is performed to consolidate the representation field vectors 316 to a single vector, which is then shortened by a dimension reduction process 318 to become the activity vector 319. The activity vector 319, which represents the activity recorded in the event logs 232, is stored in an activity repository 320. The activity vector 319 may be stored along with an identifier of the corresponding application program.

Figure 5:
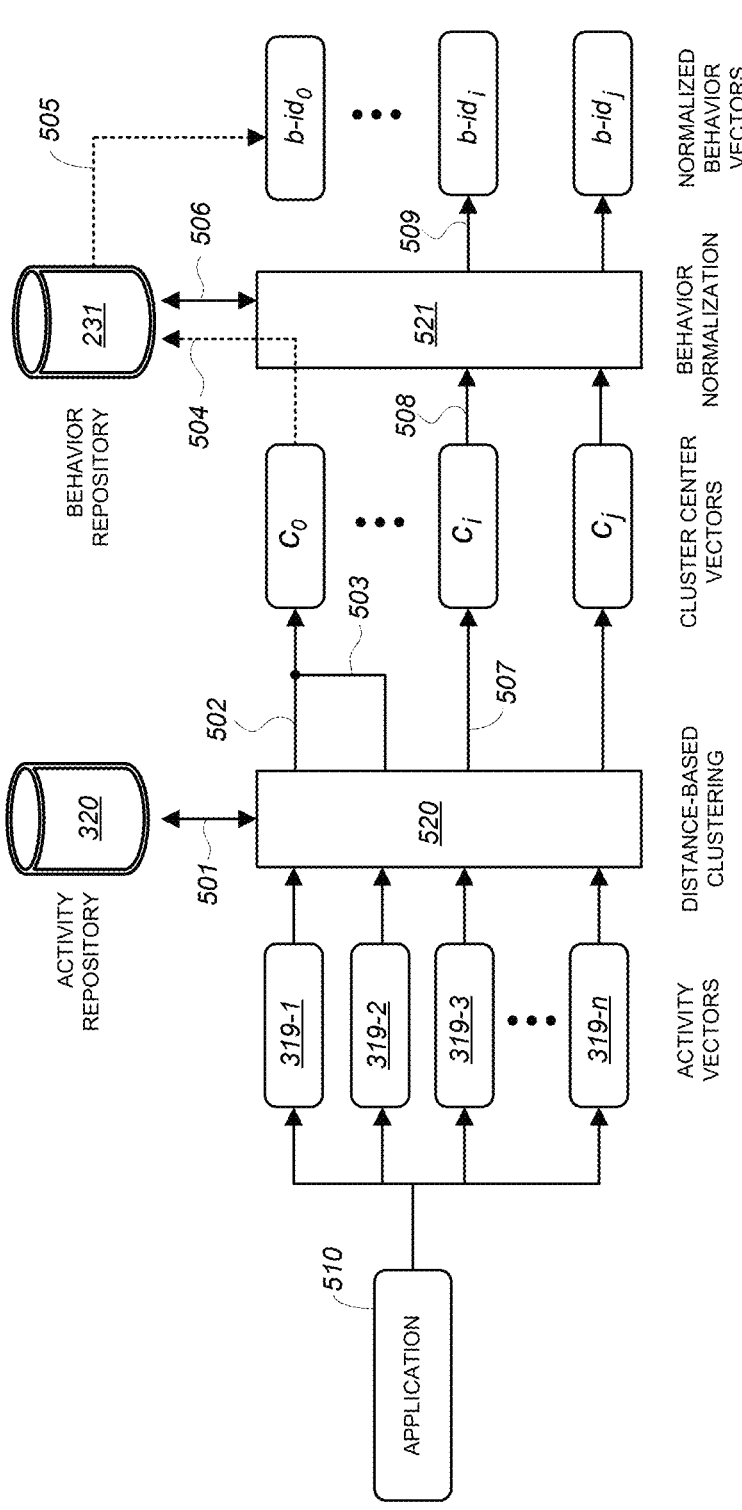
FIG. 5 is a logical diagram that illustrates generation of behavior vectors of an application program in accordance with an embodiment of the present invention.

FIG. 5 is a logical diagram that illustrates generation of behavior vectors of an application program in accordance with an embodiment of the present invention. In the example of FIG. 5, the activities of an application program 510 are converted to activity vectors 319 (i.e., 319-1, 319-2, 319-3, . . . , 319-n). The activity vectors 319 may be retrieved from the activity repository 320 (see arrow 501). A distance-based clustering process 520, e.g., Density-based Spatial Clustering of Applications with Noise (DBSCAN), correlates similar activity vectors 319 to generate clusters of activity vectors 319. As a particular example, the activity vector 319-1 (see arrow 502) and activity vector 319-2 (see arrow 503) are correlated and belong to the same cluster that has a center C0. It is to be noted that a center of a cluster is in vector form, which is also referred to herein as a center vector.

The members of each cluster are similar in terms of distance and represent a specific behavior. That is, activity vectors 319 that belong to the same cluster are identified as exhibiting the same behavior. Each cluster may be represented by its center, which is in the same vector form as the members of the cluster. Generally speaking, a center of a cluster is the middle of the cluster and may also be described as an average or median of the members of the cluster. The radius of a center of the cluster is the "spread" or variability of the members of the cluster, and may also be described in terms of standard deviation, variance, average distance from the center, etc. A center of a cluster is designated as a behavior vector, i.e., a center vector is designated as a behavior vector of a behavior.

In the example of FIG. 5, the clustering process 520 yields a plurality of clusters with center vectors C0, . . . , Ci, and Cj. A behavior normalization process 521 normalizes each center vector, with each normalized center vector being designated as a normalized behavior vector. The normalization process 521 aligns the value range, vector length, and other data of the center vectors to those in the behavior repository 231 (see arrow 506). In the example of FIG. 5, the center vectors C0, . . . , Ci, and Cj are designated as normalized behavior vectors b-id0, . . . , b-idi, and b-idj, respectively, of the application program 510. For example, the clustering process 520 yields a cluster with a center vector Ci (see arrow 507), which is normalized (see arrow 508) to yield a behavior vector b-idi (see arrow 509).

The normalized behavior vectors are stored in the behavior repository 231. When a center vector has a pre-existing entry in the behavior repository 231, i.e., the center vector represents a previously encountered behavior, the pre-existing entry in the behavior repository 231 is employed. In the example of FIG. 5, the center vector C0 is pre-existing in the behavior repository 231 (see arrow 504). Accordingly, the pre-existing center vector C0 in the behavior repository 231 is used as the behavior vector b-id0 of the application program 510 (see arrow 505). Otherwise, when a center vector is not in the behavior repository 231, i.e., the center vector represents a newly encountered behavior, a behavior identifier is generated and stored along with the center vector. Behavior identifiers may be monotonically increasing. In the example of FIG. 5, the application program 510 may be expressed in the following format:

{"b-id": <vector>, . . . "b-idi": <vector>, "b-idj": <vector>} with b-id0, . . . , b-idi, and b-idj being identifiers of corresponding behavior vectors<vector>.

Figure 6:
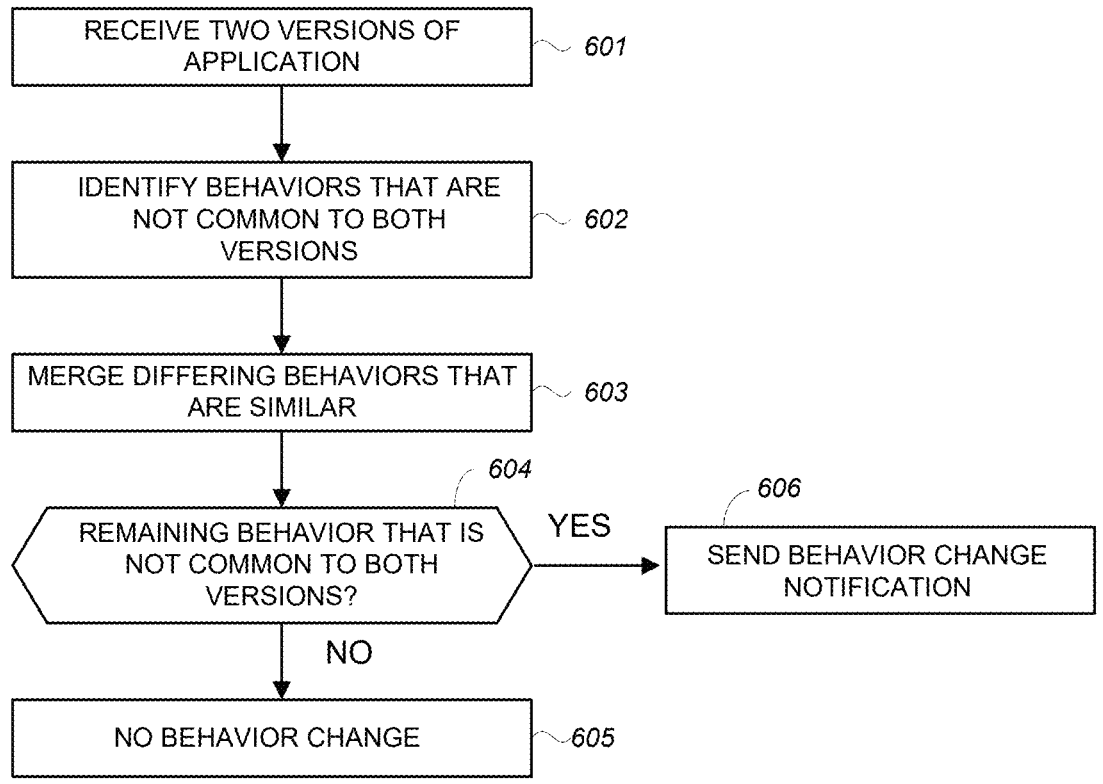
FIG. 6 is a flow diagram of a method detecting behavior change between versions of an application program in accordance with an embodiment of the present invention.

FIG. 6 is a flow diagram of a method detecting a behavior change between versions of an application program in accordance with an embodiment of the present invention. The method of FIG. 6 may be performed by the evaluation system 130 on two versions of an application program that a supplier provides to its customers.

In the example of FIG. 6, behaviors of the two versions of the application program are retrieved from a behavior repository (step 601). The behaviors of both versions have been identified by executing them. Differing behaviors, i.e., behaviors that are not common to both versions of the application program, are identified (step 602), e.g., using the Jaccard similarity algorithm. Differing behaviors that are similar are merged together (step 603). No behavior change is detected when all the behaviors of both versions are detected to be common to both versions (step 604 to step 605). A behavior change is detected when at least one differing behavior remains after the merging step, in which case a behavior change notification is issued.

Figure 7:
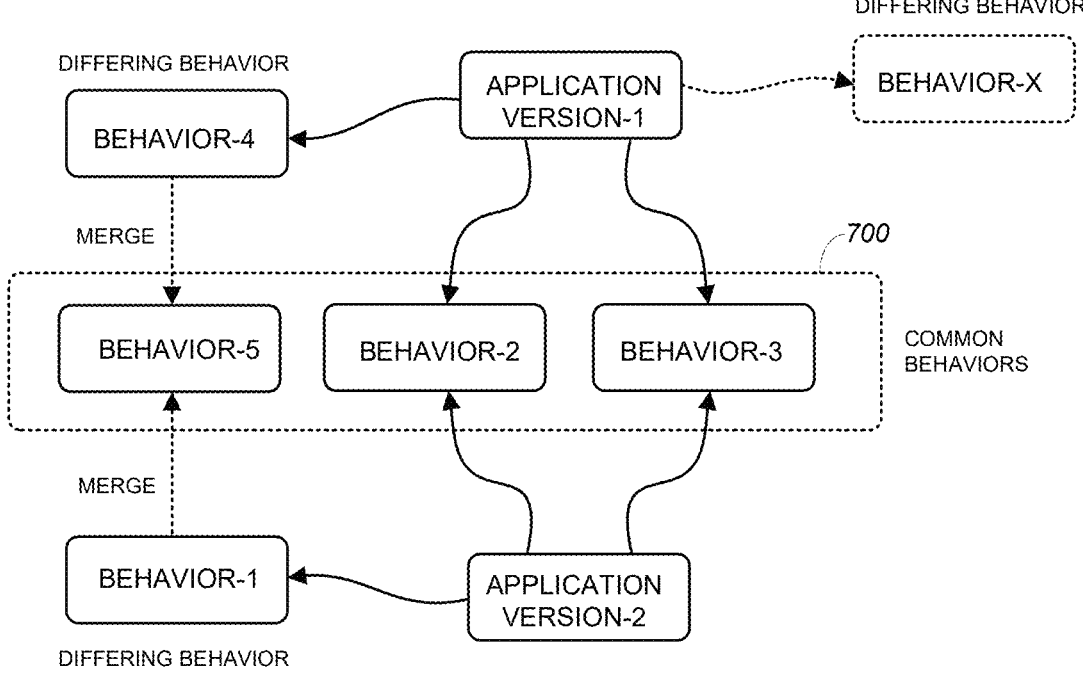
FIG. 7 is a logical diagram that illustrates the method of FIG. 6 using a particular example.

FIG. 7 is a logical diagram that illustrates the method of FIG. 6 using a particular example. In the example of FIG. 7, the application version-1 is a new version of an application program and the application version-2 is a previous version of the application program. The application version-1 has exhibited behaviors labeled as behavior-2, behavior-3, and behavior-4, whereas the application version-2 has exhibited behaviors labeled as behavior-1, behavior-2, and behavior-3. Only three behaviors for each version are shown for ease of illustration.

In the example of FIG. 7, behavior-2 and behavior-3 are common to both version-1 and version-2. However, behavior-4 is only exhibited by version-1 and behavior-1 is only exhibited by version-2. In this example, behavior-4 is similar to behavior-1. Accordingly, behavior-4 is merged with behavior-1 to become a behavior-5. This results in both version-1 and version-2 having a behavior set 700 consisting of behavior-2, behavior, 3, and behavior 5. It is to be noted that if behavior-4 and behavior-1 are found to belong in clusters that are within a predetermined distance, the two clusters may be merged.

In the example of FIG. 7, there is no remaining differing behavior after the merging step, so a behavior change is not detected. However, if at least one differing behavior remains, such as when version-1 has a behavior-X that cannot be merged with a common behavior, then a behavior change is detected.

Figure 8:
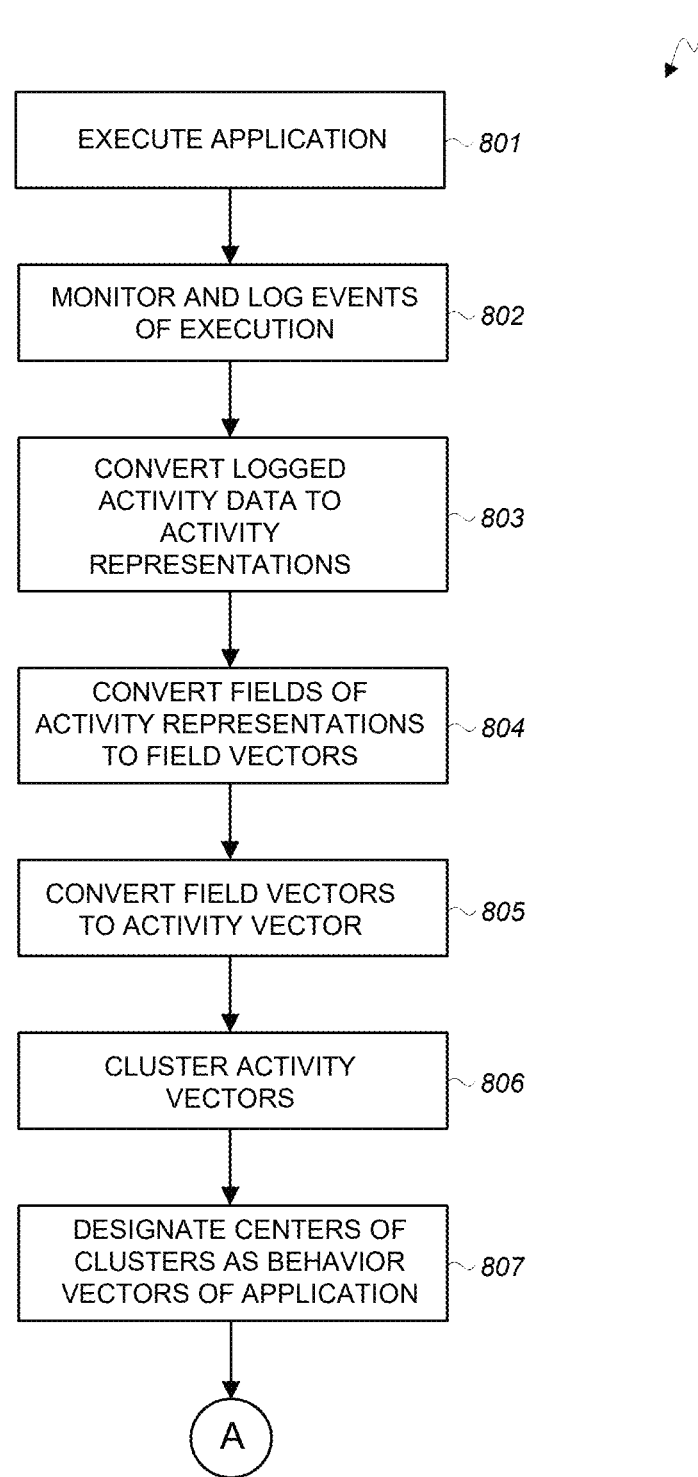
FIGS. 8 and 9 show a flow diagram of a method of evaluating an application program to protect customers against supply-chain attacks in accordance with an embodiment of the present invention.
Figure 9:
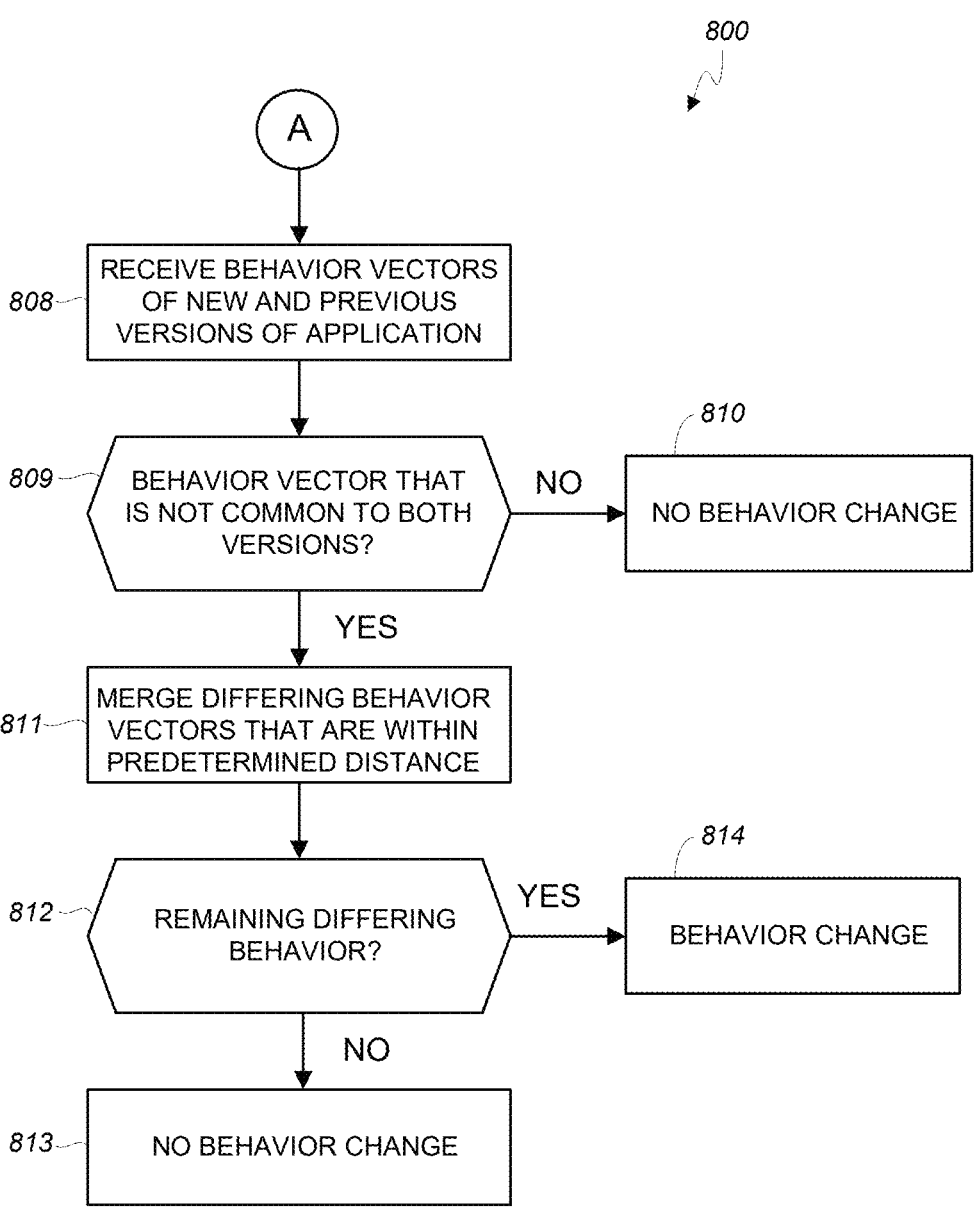

FIGS. 8 and 9 show a flow diagram of a method 800 of evaluating an application program to protect customers against supply-chain attacks in accordance with an embodiment of the present invention. The method 800 may be performed by the evaluation system 130.

Beginning in FIG. 8, a sample application program is executed (step 801). Execution of the application program is monitored and events, such as activities that perform computer operations, of the execution are logged in an events log (step 802). Logged activity data in the events log is converted to an activity representation (step 803). Each field of the activity representation is converted to a field vector (step 804). The field vectors are thereafter converted to an activity vector that represents the activity indicated in the activity data (step 805). The aforementioned steps are performed for all activity data recorded in the events log, thereby resulting in a plurality of activity vectors of the application program. The activity vectors are formed into groups by clustering (step 806). A center of a cluster of activity vectors is designated as a behavior vector that represents a specific behavior formed by the plurality of activities that are members of the cluster (step 807). The aforementioned steps are performed for all activity vectors of the application program, thereby resulting in a plurality of behavior vectors of the application program. The behavior vectors of the application program and other versions of the application program may be stored in a behavior repository.

Continuing in FIG. 9, to evaluate a new version and a previous version of an application program, the behavior vectors of the new version and the previous version are retrieved from the behavior repository (step 808). A behavior vector that is not common to both versions is identified. If there is no behavior vector that is not common to both versions, no behavior change is detected (step 809 to step 810). Behavior vectors that are not common to both versions and are within a predetermined distance are merged (step 809 to a step 811). If all behavior vectors are common to both versions after the merging step, no behavior change is detected (step 812 to step 813). Otherwise, if at least one behavior that is not common to both versions remains after the merging step, a behavior change is detected (step 812 to step 814). A behavior change notification may be issued in response to detecting a behavior change.

Figure 10:
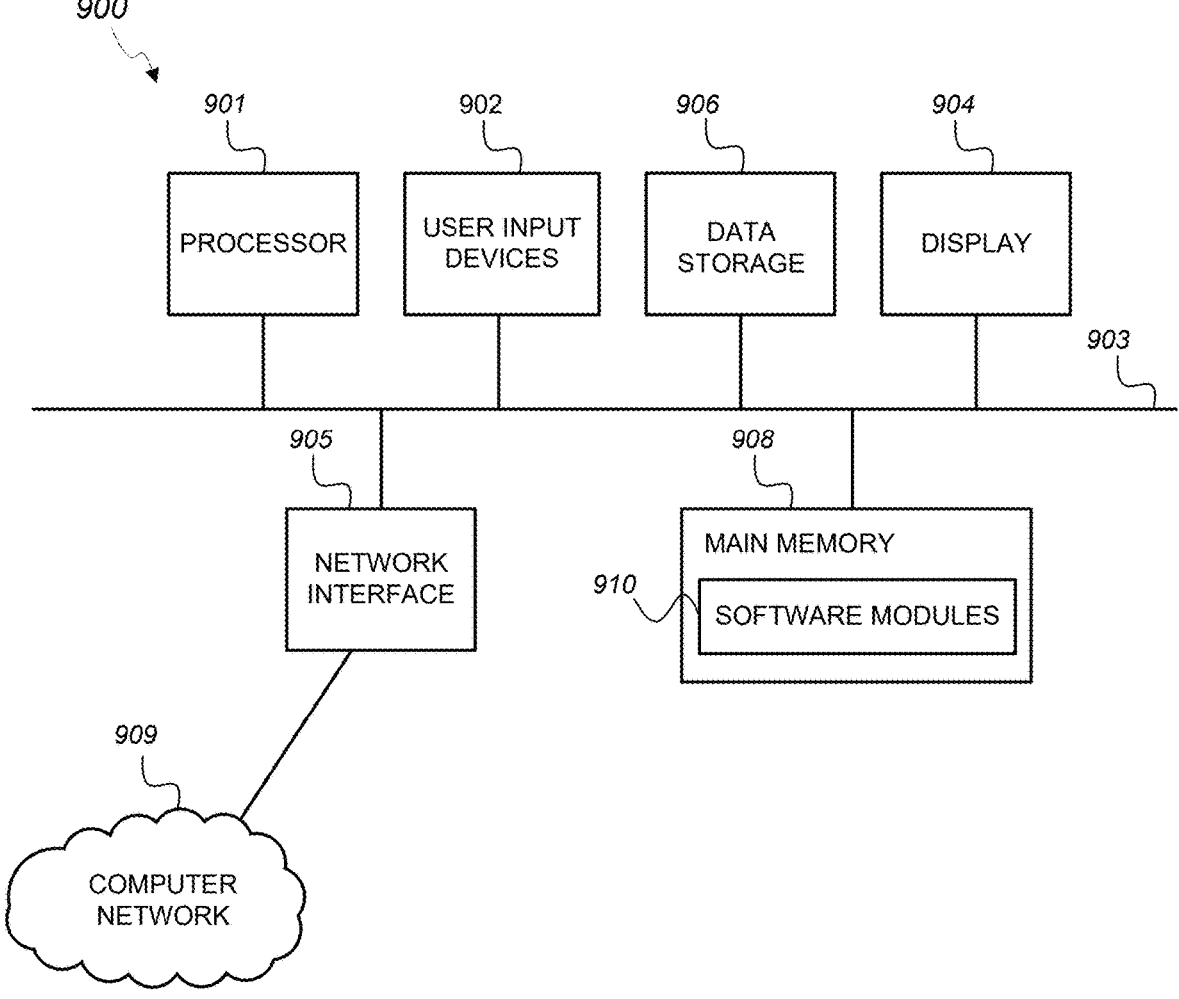
FIG. 10 is a logical diagram of a computer system that may be employed as an evaluation system in accordance with an embodiment of the present invention.

Referring now to FIG. 10, there is shown a logical diagram of a computer system 900 that may be employed as an evaluation system or other computer disclosed herein. The computer system 900 may have fewer or more components to meet the needs of a particular cybersecurity application. The computer system 900 may include one or more processors 901. The computer system 900 may have one or more buses 903 coupling its various components. The computer system 900 may include one or more user input devices 902 (e.g., keyboard, mouse), one or more data storage devices 906 (e.g., hard drive, optical disk, solid state drive), a display screen 904 (e.g., liquid crystal display, flat panel monitor), a computer network interface 905 (e.g., network adapter, modem), and a main memory 908 (e.g., random access memory). The computer network interface 905 may be coupled to a computer network 909, which in this example includes the Internet.

The computer system 900 is a particular machine as programmed with one or more software modules 910, comprising instructions stored non-transitory in the main memory 908 for execution by the processor 901 to cause the computer system 900 to perform corresponding programmed steps. An article of manufacture may be embodied as computer-readable storage medium including instructions that when executed by the processor 901 cause the computer system 900 to be operable to perform the functions of the one or more software modules 910.

In one embodiment where the computer system 900 is configured as an evaluation system, the software modules 910 may comprise a behavior identifier and a behavior analytic engine; and the data storage device 906 may provide data storage for an events log, a behavior repository, and an activity repository.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of evaluating an application program to protect a customer against a supply chain attack, the method comprising:

executing a first version of the application program to identify a first set of behaviors exhibited by the first version of the application program during execution;

executing a second version of the application program to identify a second set of behaviors exhibited by the second version of the application program during execution;

identifying a plurality of differing behaviors of the first and second versions of the application program, each of the plurality of differing behaviors comprising a behavior that is not common to both the first set of behaviors and the second set of behaviors;

merging behaviors of the plurality of differing behaviors that are similar; and detecting a behavior change of the application program in response to identifying a behavior of the plurality of differing behaviors that cannot be merged with another behavior of the plurality of differing behaviors; and issuing a behavior change notification in response to detecting the behavior change of the application program.

2. The method of claim 1, wherein the method is performed on a computer system of the customer.

3. The method of claim 1, wherein the method is performed as an in-the-cloud service for the customer.

4. The method of claim 1, wherein the application program is provided by a supplier to the customer over the Internet.

5. The method of claim 1, wherein the plurality of differing behaviors are identified using a Jaccard similarity algorithm.

6. A system comprising a memory and at least one processor, the memory storing instructions that when executed by the at least one processor cause the system to:

execute a first version of an application program to identify a first set of behaviors exhibited by the first version of the application program during execution;

execute a second version of the application program to identify a second set of behaviors exhibited by the second version of the application program during execution;

identify a plurality of differing behaviors of the first and second versions of the application program, each of the plurality of differing behaviors comprising a behavior that is not common to both the first set of behaviors and the second set of behaviors;

merge behaviors of the plurality of differing behaviors that are similar;

detect a behavior change of the application program when a behavior of the plurality of differing behaviors cannot be merged with another behavior of the plurality of differing behaviors; and detect no behavior change of the application program when each of the plurality of differing behaviors can be merged with another behavior of the plurality of differing behaviors.

7. The system of claim 6, wherein the instructions stored in the memory when executed by the at least one processor cause the system to:

issue a behavior change notification in response to detecting the behavior change of the application program.

8. The system of claim 6, wherein the application program is provided by a supplier to a customer.

9. The system of claim 8, wherein the system is an execution platform of the customer.

10. The system of claim 8, wherein the system is provided to the customer as an in-the-cloud service.

* * * * *